Patented Oct. 31, 1933

1,933,067

UNITED STATES PATENT OFFICE 1,933,067

CATALYTIC BODY AND METHOD OF MAKING THE SAME

Lloyd F. Nickell, East St. Louis, Ill., assignor, by mesne assignments, to Monsanto Chemical Company, a corporation of Delaware No Drawing. Application August 8, 1929
Serial No. 384,500

3 Claims. (Cl. 23—233)

This invention relates to carriers for catalytic bodies and it has particular relation to carriers which are employed in vapor phase chemical catalysis.

A specific application of the principles of my invention includes the catalytic carriers employed in the oxidation of sulphur dioxide to sulphur trioxide by means of platinum or vanadium oxide catalysts.

In the U. S. Patent No. 687,834, issued to De-Haen, there is described a process for manufacturing sulphuric anhydride according to which vanadium oxide is precipitated to a fine state of division on asbestos, pumice stone and other highly porous mineral matter. In U. S. Patent No. 1,371,004, issued to Slama and Wolf, there is described a process according to which a finely divided carrier not exceeding 60 microns in diameter is treated with a vanadium compound, such as vanadic oxide, ammonium vanadate or potassium vanadate to form a sulphuric anhydride catalyst. In order to gain the benefits of this process, it is desirable that the material be much smaller than 60 microns, preferably in the neighborhood of one micron.

Although a good catalyst may be made by treating a porous carrier, such as kieselguhr, with a material capable of depositing vanadium oxide on the carrier, even when the carrier particles exceed 5000 microns in diameter, improved results may be had by manufacturing a uniform artificial carrier body, which consists essentially of kieselguhr embedded in a matrix of silica. Thus for example, I have found that the natural kieselguhr particles disintegrate readily and produce an undesirable accumulation of finely divided kieselguhr dust particles, which not only interfere with the catalytic processes, but tend to restrict the flow of gases through the catalytic mass, and are otherwise difficult to handle. Furthermore, the natural kieselguhr fragments are necessarily of non-uniform dimension, resulting in uneven distribution of mass and channeling of the gas stream flowing through the mass.

Contrary to the observations made by earlier workers, I have found that the individual particle size is of minor importance. In fact, at commercial loadings natural kieselguhr fragments of 5000 microns diameter give conversions which are at least as good as catalysts formed of carriers having a particle size of less than 60 microns. However, a uniform fragment shape is desirable, in that the gas flowing through such carrier is more uniformly distributed and the resistance to its flow is lower. Furthermore, a uniform distribution results in uniform contact and uniform conversion, and a lowering of resistance to gas flow results in a reduction in the amount of power required to force the gas through the catalyst, which, in turn, is reflected in a reduced cost of the product.

I have found that by mixing kieselguhr with sufficient water glass to form a workable mass, forming such mass into uniform pellets and thereafter decomposing the water glass, there results a homogeneous product which is essentially kieselguhr embedded in a matrix of silica. Such a product is relatively free from tendency to dust, is stronger than the natural kieselguhr particles, does not disintegrate even in boiling water, is uniform in size and offers a minimum resistance to gas flow.

A preferred embodiment of my invention consists in mixing approximately 23 parts of kieselguhr with 18 parts commercial potassium water glass and sufficient water to form a workable dough-like mass, which is made into pellets and dried at about 110° C. Pellets of $\frac{7}{32}$" diameter have given satisfactory results. After or simultaneously with the drying operation, the silicate is decomposed by calcination in a stream of an acid gas, such as sulphur burner gas. The temperature is maintained at approximately 400° C. during which the sulphur dioxide reacts with the basic silicate to form silica and the alkali salt. When the calcination is complete and the resulting product is cooled sufficiently to be handled conveniently, it is sprayed, immersed or otherwise treated with a catalytic material. For sulphuric anhydride catalysis 3 parts of ammonium vanadate are mixed with a solution containing 2½ parts of caustic potash, both of which are substantially pure. The potassium vanadate thus formed is sprayed on the blank pellets until they contain about 40 to 50 grams of vanadium pentoxide per liter of the artificial carrier fragment. The product gives excellent conversions when utilized in the usual manner.

According to a modification of this process, I may mix kieselguhr and potassium silicate in the manner hereinabove set forth, after which an amount of acid sufficient to neutralize the alakali in the water glass is added. The hydrated silica thus formed acts as a binding agent in a manner analogous to the water glass employed in the previous example. Pellets are formed, dried and calcined to dehydrate the silicic acid. At the elevated temperature the water in the silicic acid is driven off, forming a matrix of silica wherein are embedded the individual particles of kieselguhr. In the one process the decomposition of the silicate by means of an acidic agent is realized in the liquid state, whereas in the other it is realized in the course of the calcination with sulphur dioxide.

The quality of the kieselguhr which is employed is of consequence. I have been able to obtain the best results with a diatomacious earth mined in California. At commercial loadings, uniformed conversions of over 98% are obtained. A commercial loading may be defined as a rate of flow of sulphur dioxide gas equivalent to 4 pounds of sulphur per 24 hours per liter of catalyst.

The water glass which is employed is preferably the potassium water glass. Any pure soluble vanadium compound may be used; the most satisfactory—both from the standpoint of convenience as well as cost—is potassium vanadate, which has been prepared by reacting ammonium meta vanadate with caustic potash.

Although a specific application of the principles of this invention has been described in connection with the manufacture of a sulphuric anhydride catalyst, the feature of forming pellets by cementing a pulverized material in a matrix of silica is applicable to the preparation of other catalysts, particularly those to be employed in connection with vapor phase catalysis. Accordingly, the pellets may be saturated with nickel compounds and thereafter subjected to a reducing atmosphere, leaving a deposit of finely divided nickel on a carrier, which is of uniform dimension and which possesses many advantages over other mineral carriers now employed. In a like manner the pellets may be treated with other catalytic materials, giving equally satisfactory results. The fact that the pellets made according to the process herein described are strong, uniform and do not disintegrate when immersed in water for prolonged periods even at elevated temperatures makes them particularly suited to many varied and widely different applications.

What I claim is:

1. A method of manufacturing a catalyst carrier for the manufacture of sulphuric anhydride which is substantially void of catalytic activity that comprises mixing waterglass with kieselguhr to form a dough-like mass, forming pellets of the resulting mass, subsequently drying the pellets and decomposing the waterglass by means of an acidic vapor, thereby forming a conglomerate consisting of kieselguhr embedded in a matrix of silica.

2. A method of manufacturing a catalyst which comprises mixing waterglass with kieselguhr to form a dough-like mass, forming pellets of the resulting mass, drying the pellets and decomposing the waterglass by means of an acidic reagent, thereby forming a conglomerate consisting of kieselguhr embedded in a matrix of silica, and subsequently coating the pellets with a catalytically active composition.

3. A method as defined in claim 2 and further characterized in that the catalytically active composition contains a compound of vanadium.

LLOYD F. NICKELL.